Oct. 4, 1932. W. C. McKESSON 1,881,367
VALVE STRUCTURE AND CONTROL MECHANISM THEREFOR
Filed May 27, 1930
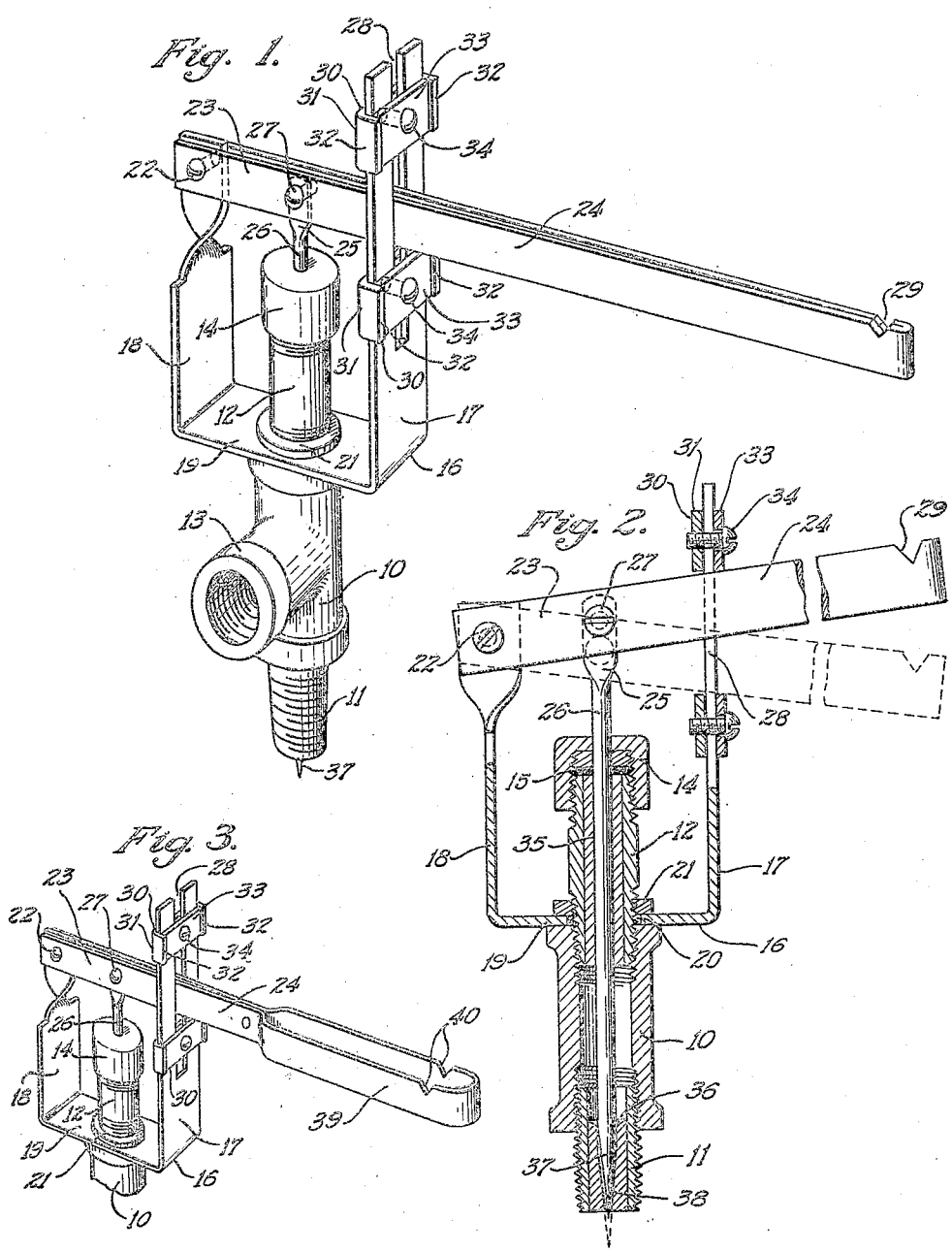
William C. McKesson.
INVENTOR
BY Victor J. Evans
HIS ATTORNEY Patented Oct. 4, 1932

1,881,367

UNITED STATES PATENT OFFICE

WILLIAM C. McKESSON, OF CHICAGO, ILLINOIS

VALVE STRUCTURE AND CONTROL MECHANISM THEREFOR

Application filed May 27, 1930. Serial No. 456,345.

This invention relates to certain novel improvements in valve structures and control mechanism therefor, and has for its principal object the provision of an improved construction of this character which will be highly efficient in use and economical in manufacture.

The valve structure and control mechanism therefor, to be hereinafter described, is especially adapted to be used in connection with oil burners, the valve being designed to control the supply of fuel to the burner and the control mechanism being especially designed to automatically close the valve structure in the event of overflow of fuel to the burner pan or burner of the oil burner, and it is among the several objects of this invention to provide a valve structure and control mechanism therefor which is adapted to have associated therewith a catch pan or basin which will automatically operate the mechanism for closing the valve structure when the weight of the pan or basin by reason of the fuel drained therein is sufficient to operate the mechanism.

A still further object of the invention resides in the novel manner of forming the valve stem sleeve and seat in the valve structure.

A still further object of the invention is the novel arrangement of the several parts of the device which afford expeditious assembly thereof and which will afford ready association with the feed and supply pipe of an oil burner or other like device.

Other objects will appear hereinafter.

The invention consists in the novel combination and arrangement of parts to be hereinafter described and claimed.

The invention will be best understood by reference to the accompanying drawing, showing the preferred form of construction and in which:

Fig. 1 is a perspective view of the invention;

Fig. 2 is a vertical sectional detail view of the same; and

Fig. 3 is a perspective view of the invention, illustrating a slightly modified form of construction.

Referring particularly to the drawing, showing the preferred form of construction of the invention, a substantially T-shaped fitting is indicated at 10. To the head branch of this fitting is adapted to be connected a connector 11 which is threaded to the head branch as shown. Also to the head branch of this fitting at the opposite end thereof is adapted to be connected a nipple 12 likewise threaded into the head branch of the fitting 10 as shown. The branch 13 of this fitting 10 is adapted to be connected to the feed pipe (not shown) leading to the oil burner. The connector 11 is adapted to be connected to a supply pipe (not shown) leading from a suitable source of oil fuel supply or the like. Threaded upon the nipple 12 is a cap 14 and associated with this cap in the interior thereof is a suitable packing structure 15 which provides an effective seal thereby eliminating the possibilities of leakage. Associated with the valve structure thus far described is a substantially U-shaped bracket 16 providing oppositely disposed limbs 17 and 18. This bracket 16 at its bight portion 19 is provided with a central opening 20 through which projects the lower end portion of the nipple 12 and threaded upon this lower end portion of the nipple 12 is a lock nut 21 which locks the bracket upon the nipple 12 between the lock nut and the fitting 10 as shown.

The upper end portion of the limb 18 is disposed at substantially right angles with respect to the lower end portion of this limb and pivotally connected as at 22 by means of a nut bearing bolt to this end portion is the inner end portion 23 of a handle or bar structure 24. This bar structure 24, as shown in Figs. 1 and 2, is formed from an elongated strip of material bent substantially U-shaped upon itself and disposed between the corresponding end portions is the upper end portion 25 of a valve stem 26. This upper end portion 25 is pivotally connected to the handle or bar 24 by means of a nut bearing bolt 27. The handle or bar 24 extends through a slot 28 formed in the upper end portion of the limb 17. The outer end portion of the handle or bar 24 is provided with a V-shaped notch 29 from which is adapted to suspend the handle of a bucket or basin (not shown). The pivotal movement of the handle or bar 24 is limited by means of adjustable stops 30. Each of these stops 30 include a substantially U-shaped plate 31 which embraces the slotted end portion of the limb 17 and disposed between the ends 32 of this plate is a second plate 33 connected to the U-shaped plate 30 by means of a bolt 34. By this arrangement the stops may be adjusted relative to the limb 17 whereby to limit the pivotal movement of the handle or bar 24.

Prior to the assembling of the nipple 12 with its associated parts of the valve structure, the bore of the nipple is filled with a suitable babbitt or other like material. After the babbitt has become hardened a longitudinal opening 35 is drilled through the babbitt. This opening is of a diameter sufficient to receive the valve stem 26 and to create a slight friction. Likewise, prior to the assembling of the connector 11 with the fitting 10 the passage or bore thereof is filled with babbitt or other like material. Portions of this babbitt are removed by means of a suitable drill, and the babbitt being of a soft material, the pointed end 37 of the valve stem which constitutes the valve head is projected centrally through the remaining portion of the babbitt filling to provide the opening 38, which defines the valve seat. By this arrangement the valve head and stem will form a proper facing against the babbitt thereby providing an effective seal when the valve head and stem is disposed in closed position.

In Fig. 3, the handle or bar 24 is provided at its outer end portion with a handle shaped end 39 which likewise may be provided with suitable V-shaped notches 40 for substantially the same purposes as the V-shaped notch 29. In this form of construction, the handle being enlarged, facilitates operation thereof by hand. The device as shown in Fig. 3 is otherwise substantially similar to the structure illustrated in Figs. 1 and 2.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. A valve structure comprising a substantially T-shaped structure having a passage extending therethrough, the lower end of which provides an inlet and having an outlet passage branched therefrom, means in said inlet passage providing a valve seat, a valve stem in said passage and including a head adapted to be disposed on said seat to close said inlet, a substantially U-shaped bracket including spaced apart arms and a bight portion mounted on said structure, an operating member connected to said valve stem and having one end thereof connected to one of said arms, the other of said arms having a slot therein through which said member is extended, and means slidably mounted on said last named arm above and below said member for limiting pivotal movement thereof.

2. A valve structure comprising a substantially T-shaped structure having a passage extending therethrough, the lower end of which provides an inlet and having an outlet passage branched therefrom, means in said inlet passage providing a valve seat, a valve stem in said passage and including a head adapted to be disposed on said seat to close said inlet, a substantially U-shaped bracket including spaced apart arms and a bight portion mounted on said structure, an operating member connected to said valve stem and having one end thereof connected to one of said arms, the other of said arms having a slot therein through which said member is extended, means slidably mounted on said last named arm above and below said member for limiting pivotal movement thereof, and means for securing said slidable means in predetermined positions on said last mentioned arm.

3. A valve structure including a fitting, a connector associated with a fitting, a nipple in the connector, a valve seat in the nipple, a valve stem including a head adapted to be disposed on said seat to close passage through the nipple, connector and fitting, an operating member pivotally connected to the valve stem, a supporting bracket for the operating member, and slidable means on said bracket for limiting movement of said operating member.

In testimony whereof I affix my signature.
WILLIAM C. McKESSON.